United States Patent
Hushon, Jr. et al.

(10) Patent No.: US 9,436,635 B1
(45) Date of Patent: Sep. 6, 2016

(54) LEASES IN A HETEROGENOUS DATA ENVIRONMENT

(71) Applicant: EMC Corporation, Hopkinton, MA (US)

(72) Inventors: John D Hushon, Jr., Medfield, MA (US); Thomas J McSweeny, Hoquiam, WA (US); David Stephen Reiner, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/770,139

(22) Filed: Feb. 19, 2013

Related U.S. Application Data

(63) Continuation-in-part of application No. 13/758,698, filed on Feb. 4, 2013, now Pat. No. 8,984,536, and a continuation-in-part of application No. 13/599,391, filed on Aug. 30, 2012, now abandoned.

(60) Provisional application No. 61/529,087, filed on Aug. 30, 2011.

(51) Int. Cl.
  *G06F 3/00* (2006.01)
  *G06F 9/44* (2006.01)
  *G06F 9/46* (2006.01)
  *G06F 13/00* (2006.01)
  *G06F 13/372* (2006.01)

(52) U.S. Cl.
  CPC .................................. *G06F 13/372* (2013.01)

(58) Field of Classification Search
  None
  See application file for complete search history.

(56) References Cited

U.S. PATENT DOCUMENTS

| | | | |
|---|---|---|---|
| 6,173,293 B1* | 1/2001 | Thekkath et al. | |
| 6,772,162 B2* | 8/2004 | Waldo et al. | |
| 6,842,754 B2* | 1/2005 | Muntz | |
| 7,421,585 B2* | 9/2008 | Aoki et al. | 713/182 |
| 8,185,566 B2* | 5/2012 | George et al. | 707/821 |
| 2002/0091874 A1* | 7/2002 | Jones et al. | 709/330 |
| 2006/0168591 A1* | 7/2006 | Hunsinger et al. | 719/318 |
| 2008/0281865 A1* | 11/2008 | Price et al. | 707/103 Y |
| 2009/0037832 A1* | 2/2009 | Falchuk | G06F 9/4443 715/764 |
| 2009/0063620 A1* | 3/2009 | Hanna et al. | 709/203 |
| 2009/0070786 A1* | 3/2009 | Alves | G06F 9/541 719/318 |
| 2012/0110153 A1* | 5/2012 | Atkins et al. | 709/223 |

OTHER PUBLICATIONS

Aleksander Andrzej Slominski, "Proposed Event System: Grid SOAP Events," Feb. 23, 2002, pp. 1-7, retrieved from http://www.extreme.indiana.edu/xgws/papers/events_paper/node4.html on Dec. 20, 2013.*

* cited by examiner

*Primary Examiner* — H S Sough
*Assistant Examiner* — William C Wood
(74) *Attorney, Agent, or Firm* — Krishnendu Gupta; Joseph D'Angelo

(57) ABSTRACT

A computer implemented method, system and product comprising establishing a lease contract for an analytic subscription, defining an analytic subscription as an evaluation that is passed to a provider that provides a Boolean evaluation model and a potential true/false event expression, receiving, via the bus, events from the systems of records until the expiration of the lease; and rejecting during a specified period of time events received from the systems of record after the expiration of the lease period.

21 Claims, 20 Drawing Sheets

LEASES IN A HETEROGENOUS DATA ENVIRONMENT

RELATED APPLICATIONS

This application claims the benefit of priority of: U.S. Patent Application Ser. No. 61/529,087 entitled "SYSTEM FOR INTEGRATION, RENDERING, AND PURPOSE-BASED USE OF HETEROGENEOUS DATA FROM MULTIPLE SOURCES" filed Aug. 30, 2011; U.S. Patent Application Ser. No. 61/529,087 entitled "FLEXIBLE PROCESSING IN DISTRIBUTED SYSTEMS (FPDS)" filed Aug. 30, 2011; "INFORMATION INTEGRATION AND TRANSFORMATION SERVICES (IITS)" filed Aug. 30, 2011, U.S. patent application Ser. No. 13/599,391 entitled "HETEROGENEOUS DATA FROM MULTIPLE SOURCES" filed Aug. 31, 2012; and U.S. patent application Ser. No. 13/758,698 entitled "HETEROGENEOUS DATA FROM MULTIPLE SOURCES" filed Feb. 4, 2013; all of which are incorporated herein by reference for all purposes.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Event processing systems are coming into increasingly widespread use in a variety of different enterprises. However, existing event processing systems have a number of significant drawbacks. For example, such systems often require custom-built transformations for each different type of input event information to be processed, and are generally unable to detect, normalize and combine event information from multiple federated information sources. Also, the existing event processing systems are typically very limited in terms of the complexity of events that can be recognized and processed.

A given enterprise may therefore have to combine multiple disparate event processing systems in order to handle complex events. In addition, exception handling in such arrangements often requires extensive human intervention. As a result, the deployment of complex event processing functionality can be unduly expensive and time-consuming for the enterprise.

SUMMARY

A computer implemented method, system and product comprising establishing a lease contract for an analytic subscription, defining an analytic subscription as an evaluation that is passed to a provider that provides a Boolean evaluation model and a potential true/false event expression, receiving, via the bus, events from the systems of records until the expiration of the lease; and rejecting during a specified period of time events received from the systems of record after the expiration of the lease period.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
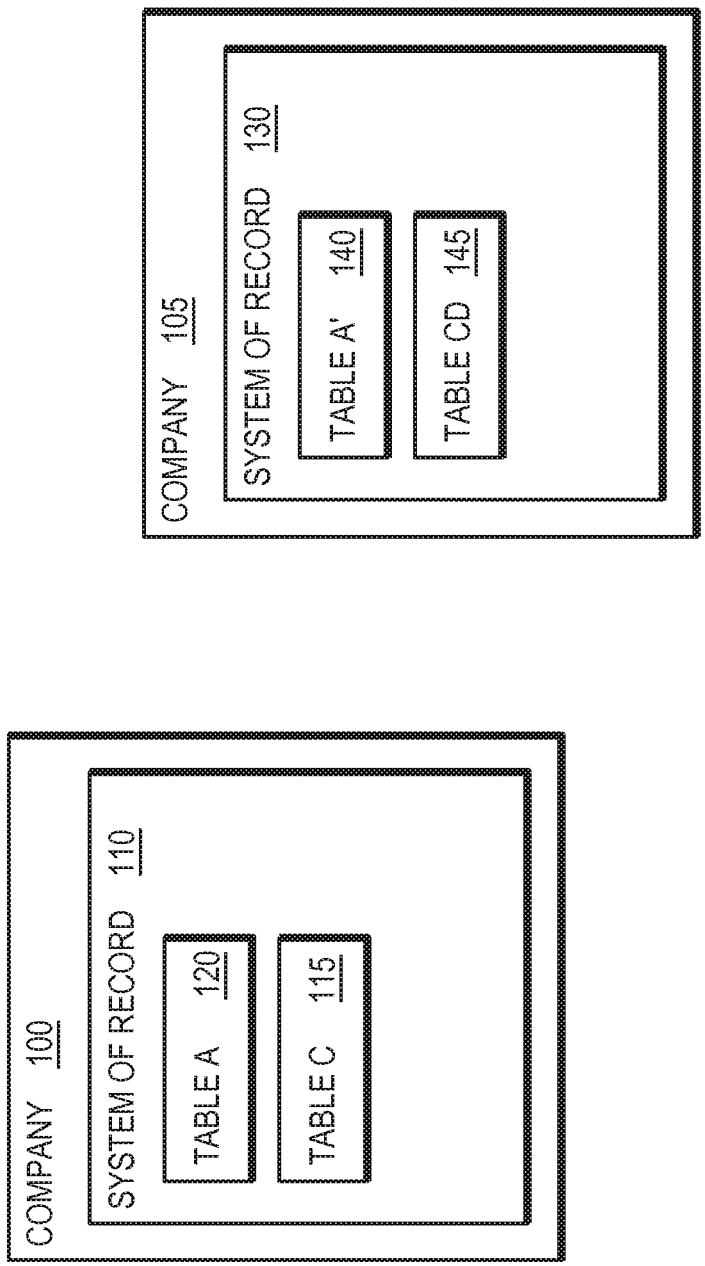
FIG. 1 is an example of an embodiment of two companies with different systems of records or databases, in accordance with an embodiment of the present disclosure.

In an embodiment, the current disclosure may enable a reasoning service bus. In some embodiments the service bus may provide a way to link and transfer data between multiple systems. In most embodiments, the service bus may have understanding of how information in multiple systems relate. In a particular embodiment, relationship information between multiple systems may be represented as metadata. In another embodiment, relationship information between multiple systems may be represented as RDF, XML or a similar mark-up language. In some embodiments, a reasoning service bus may consume events generated by a system. In most embodiments, the service bus may reason on a consumed event to determine if other systems may be interested in the event. In further embodiments, the service bus may create and send events to other systems that are interested in a consumed event. In certain embodiments, a service bus or a mastering service of a service bus may classify tag, augment, link, modify or transform an event. In at least some embodiments, each system may publish all events to an adaptor, which may translate the event to an event type under by a reasoning service bus. In other embodiments, the adapter may be communicatively coupled to both a system and the service bus.

In certain embodiments, the service bus may be able to provide analytics on events. In some embodiments, the service bus may be able to mitigate multiple conflicting events, such as a change storm. In most embodiments, the service bus may enable a database query that queries different databases with different database schema linked by the service bus. In further embodiments, the service bus may enable dynamic assertions about how entities in multiple systems or databases are related to keep information in the other systems up to date. In further embodiments, the service bus may enable information in one system or database to be propagated to other systems or databases.

In other embodiments, the service bus may enable stewardship. In further embodiments, the current disclosure may enable the concept of leases. In at least one embodiment, a lease may indicate a period of time for which an event is valid. In other embodiments, if a system seeks to publish or consume an event when the system's lease has expired, the system may be forced to start from a consistent point of time. In still further embodiments, the current disclosure may enable terse events or lightweight notifications. In some embodiments, a terse event or lightweight notification may notify multiple systems that an event has occurred. In most embodiments, when a system receives a terse event or lightweight notification, the system may poll the event generator for more information on the terse event or lightweight notification. In at least some embodiments, the terse event or lightweight notification may enable a security context. In still further embodiments, the service bus may implement a gossip type protocol. In other embodiments, the service bus may enable both unicast and multicast to systems or databases coupled to the service bus.

Conventionally, a wide variety of different types of data processing systems exist, including transactional, operational, and decision support systems. Typically, many systems have associated information, which may change dynamically. Generally, triggered by such changes, other systems need to transform, integrate, process or react to information. Conventional approaches to connecting systems within or across enterprises, including enterprise service buses, have required multiple systems to be aware of what information other systems would need for processing and what information these other systems could provide. Usually, across multiple connected systems, it is challenging to reason about information, to provide visibility into information movement, and to enforce global policies on information. Conventional practice is deficient in meeting all of these challenges. Conventional approaches do not provide timely, orderly or correct information processing, governed by global policies, and extensible to new systems, new data, new events, and new processing requirements.

Generally, a solution is to link multiple systems an enterprise service bus. Typical enterprise service buses may require each system to publish data changes made within the system and register to consume events produced and published by other systems. Conventionally, this required each system to be aware of what information other systems would need for processing. As well, conventional systems would also need to be aware of information the other systems had that it needed to consume.

Conventional approaches solved parts of the problem of integration, rendering, and purpose-based use of heterogeneous data from multiple sources. Generally, system wide policy enforcement was not possible. Typically, reasoning about data set classifications, interrelationships, and provenance for key purposes was limited or impossible. Usually, access to information could be restricted, but not its subsequent use. Conventionally, it was difficult to provide visibility into data movement and provenance, and to establish trust in a multi-tenant environment. Typically, even between two actors, it was difficult to establish semi-permeable visibility boundaries with respect to data.

In certain embodiments, the current disclosure may enable an "Information Service Bus" approach to dynamic data integration and change propagation at scale in complex environments with multiple data sources (including heritage systems) and diverse data consumers. In some embodiments, the current disclosure may combine entity matching and stewardship, change data capture, federated data model mapping and governance, use of metadata to enable consistent transformations and versioning, and materialization of for-purpose data marts and cubes. In most embodiments, topics and subjects may be used for routing and filtering normalized messages over an enterprise service bus or other messaging infrastructure. In at least some embodiments, data change events may drive the creation of data entity events that trigger asynchronous, targeted and consistent application processing. In further embodiments, for health information management, the current disclosure may facilitate patient identity management, may provide an aggregated and longitudinal view of patient records including consent management, and may automate distributed workflow. In an embodiment, the current disclosure may provide a systematic approach to multi-model mapping and reconciliation, information transformation, event handling, and provisioning of data into canonical data structures for purpose.

In most embodiments, the current disclosure may enable integration of systems. In further embodiments, the current disclosure may enable data sharing between systems when the systems do not share a common data model. In certain embodiments, integrated systems may change independently and the changes may be propagated to the other systems if the change impacts the other system.

In some embodiments, Resource Description Framework or RDF may be used to provide a language to describe linkages between subjects and objects, linked by a predicate, a "triple." In certain embodiments, these assertions may leverage namespaces, like XML, but may also be thought of based upon an "open world" model in which the assertions may describe relationships through assertions in a more unplanned and rich way. In an embodiment, an assertion may be made in which the employee in one system is the same entity as the customer in another system. In further embodiments, the models may be mapped and may also describe contexts in which an assertion applies, and may create policy controls associated with a given contextual assertion.

In most embodiments, creation of well formed multi-dimensionality and extensibility to the complex relationship graph versus fixed schema formats such as relational or XML based strategies may be enabled. In certain embodiments, by creating an RDF store that represents the full scope of the data, models, systems, controls and other critical meta-data there may be the ability to manage, through consistently associated relationships the different dimensional meta-data associated with the systems, and their integrations across an enterprise, and potentially extending as a valuable tool in information virtualization for cloud strategies. In further embodiments, the current disclosure may enable integration of divorced systems with complex types of synchronization and virtualization.

In certain embodiments, a "meta-data warehouse" may be leveraged to support the governed integrations of service oriented information systems. In some embodiments, one key element may ensure loose coupling through an information model mediation. In certain embodiments, a target system may be mapped to a canonical master. In other embodiments, mastered information message may be mapped to targets using multi-part strategies to both preserve the integrity of the source and to support lineage maintained itineraries, what changes were made, and what is done next.

In some embodiments, sketch based information modeling (SBIM) may include contextual semantic models to govern information associations across multiple data models. In other embodiments, an RDF store, or metadata repository, may manage information across models, contexts, associative maps, and controls. In certain embodiments, SPARQL may query then create XSLT stylesheets for model-to-model transformations of information. In certain embodiments, SBIM may include instance level capture of ontologically defined relationships; these may allow reasoning about properties, classifications, and usage of data sets. In alternative embodiments, this may represent a unified approach to describing and acting on metadata about data set provenance, consistency, indexing, and materialization.

In alternative embodiments, the current disclosure may enable query routing and orchestration above multiple data stores of partitioned, lag-consistent data. In further embodiments, the current disclosure may enable query routing and orchestration of multiple data stores according to a plurality of data synchronization schemes. In some embodiments, semantic description of data set classifications, interrelationships, and provenance to guide query processing may be enabled. In an embodiment, semantic description of data set classifications, interrelationships and provenance to assess and maintain desired levels of data consistency may be enabled. In further embodiments, semantic description of data set classifications, interrelationships and provenance to support audit at scale in the face of data linkage complexities may be enabled. In at least some embodiments, application of policy based obligations to the usage and dissemination of purpose-assembled data sets within a data integration and rendering environment may be enabled. In certain embodiment, supporting multi-tenancy restrictions and policies in an environment for integration and rendering of heterogeneous, federated data may be enabled.

In some embodiments, the current disclosure may enable semantic models to govern information associations across multiple data models. In some embodiments, there may be instance level capture of ontologically defined relationships; which may allow reasoning about properties, classifications, and usage of data sets. In certain embodiment, a unified approach to describing and acting on metadata about data set provenance, volatility, derivation, indexing, and materialization, as well as consistency across data sets and data stores may be enabled. In further embodiments, another category of metadata may capture interrelationships among data sets. In most embodiments, knowledge of interrelationships may allow reasoning about properties, classifications, and usage of data sets. In some embodiments, this may result in a unified approach to describing and acting on metadata about data set provenance, volatility, derivation, indexing, and materialization, as well as consistency across data sets and data stores.

In some embodiments, meta-data rich ontologies may support governance strategies, inclusive of contextual assertion/association in a stable, richer, and more declarative way. In certain embodiments, ontologies may be used to manage, in a governed way, the complex information and information systems meta-data. These ontologies may force declarative versus assumptive techniques, while patterning our information infrastructure for the Semantic Web. In some embodiments, a set of information integration infrastructure tools and patterns is presented that may enable a businesses to interrelate their producers, consumers, administrators and regulators in ways that may be easily customized in an auditable way, and in a way that supports true loose coupling.

In an embodiment, the current disclosure may support development of process- and user-driven workflows that act autonomously and in parallel to integrate and aggregate data for purpose and just in time. In certain embodiments, processing elements—as cloud-managed containers for application functionality—may raise events, make service requests, and trigger additional processing. In some embodiments, the current disclosure may have similarities to vector processing. In other embodiments, the current disclosure may combine messaging, events, complex event processing, change propagation, resource leasing, and governance for dynamic, loosely-coupled, large, distributed processing systems. In at least one embodiment, event processing may be performed through processing element subscriptions to lightweight messages containing metadata, which may trigger policy-controlled reactions including access to full-fidelity event stores. In certain embodiments, the mobility and lifecycle management of processing elements may be controlled by external infrastructure. In most embodiments, lightweight transactions may be supported and resources may be managed through time-bounded, revocable leases.

In certain embodiments, event processing may be performed through agent subscriptions. In at least some embodiments, event processing by an agent may trigger policy-controlled reactions including expanding work to be completed in reaction to the event, creating new messages, requesting services, and accessing "full fidelity" event stores to get more details on an event of interest. In some embodiments, fidelity event stores may be populated by external event recognition and processing services. In further embodiments, intelligent event routing may enable messages to be sent to interested systems or parties. In an embodiment, if an event is likely to cause thousands of agents to perform identical calculations, the event may be sent an agent and the result of that calculation sent to other agents.

In certain embodiments, the current disclosure may use a lease-based approach to resource management. In some embodiments, once a lease of a resource expires, the reaction may be policy based, ranging from resource collection and revocation of access privileges to the party whose lease expired, to invoking a compensating transaction, to merely sending a message of the form "your lease has expired." In most embodiments, a lease may gracefully deal with the loss of access to remote data sources or resources, by following policies designed to use alternate sources or business rules. In at least some embodiments, failure detection and reclamation of resources may be facilitated through lease controlled registration of topic interests by agents.

In an embodiment, if an interest is not renewed by the deadline given in the lease period, the registration of the interest may expire. In certain embodiments, leases may enable graceful handling of analytics when access to remote data sources or resources is lost, despite a partial return. In most embodiments, a lease may enable a system to recover from loss of a resource when the system may otherwise wait infinitely until the resource returns or fail entirely. In further embodiments, the lease may force a recovered resource or system to recover state from a consistent checkpoint and read a log to bring the resource up to date. In other embodiments, the lease may enable a system to perform a set of analytical calculations without restarting the calculations every time a new piece of data is available.

In certain embodiments, a lessor or landlord may be in control of a lease and may be able to cancel the lease at any time. In some embodiments, cancellation may be used for administrative tasks shifting the burden of finding a new resource to lease to a client agent. In most embodiments, a leasing service may be exploited to find an appropriate resource for a client and provide a connection to the associated lessor. In at least some embodiments, if access is needed to a specific stream or event, a client may request the stream or events and their proposed query semantics. In further embodiments, a lessor may grant or deny the resources.

In alternative embodiments, there may be different ways for a lease to expire. In some embodiments, a grant of a resource may have an associated duration. In other embodiments, a client may be responsible for lease maintenance e.g. a renewal or a new lease. In at least some embodiments, the default behavior may be a cancellation of a lease by a landlord at a temporal boundary. In at least some embodiments, a lease may be consumption or count based e.g. 2 MB. In a particular embodiment, a lease may end when a certain amount of resources is consumed. In other embodiments, if a cost based model is used, a lease may be based upon the amount of money available for the lease and may expire when the money is depleted. In a particular example, there may be a cost of consumption of data of five dollars per megabyte and twenty dollars available for data consumption. In this embodiment, once four megabytes have been consumed, the lease may end (i.e. $5*4=$20).

In at least some embodiments a lease manager may cancel a lease without notice. In further embodiments, cancellation of a lease may be used to prevent competition for a resource. In other embodiments, cancellation of a lease may notify the lessee of an intention to not provide additional leases (e.g. a shutdown or version upgrade).

In an embodiment, metadata encapsulated within a lightweight message may provide the basis for intelligent queue handling such as promotion, eviction, and replacement. FPDS incorporates volatility and lifespan information in lightweight messages. In other embodiments, a lightweight event may indicate that the event has a temporal constraint and may not be processed before a given time, or that it expires at a particular time (supporting a message specific cancellation window).

In some embodiments, security constraints may be checked when a full fidelity event is accessed by an agent after receiving a message. In an embodiment, information may be filtered, anonymized, watermarked, or otherwise modified based on the credentials presented by an agent requesting access to the information. In most embodiments, sensitive data may not be sent to a agent in the lightweight message, and is appropriately filtered on demand.

In certain embodiments, when a system responds to a terse event or lightweight notification, security access controls may be implemented when the system requests more information. In most embodiments, this may include security access control that ensures that only information that is related to the system is made available. In at least some embodiments, a terse event or lightweight notification may not include sensitive information. In further events, terse event or lightweight notification may only be routed to systems which are interested in the event. In at least some embodiments, a reasoning bus may determine which systems are interested in the terse event or lightweight notification. In further embodiments, a processing element may generate further events.

Refer the example embodiment of FIG. 1. In the example embodiment of FIG. 1, there are two systems of record, 110 and 130, which belong to companies 100 and 105 respectively. In this embodiment, the systems of records are databases such as those that may track customer sales and customer information which belong to respective companies. If company 100 associated with system of record 110 were to buy company 105 associated with system of record 130, then company 100 would need a way to exchange and update information with system of record 130. However, in this embodiment, both databases have different schemas and an update or query run on one database may not work on the other database.

Figure 2:
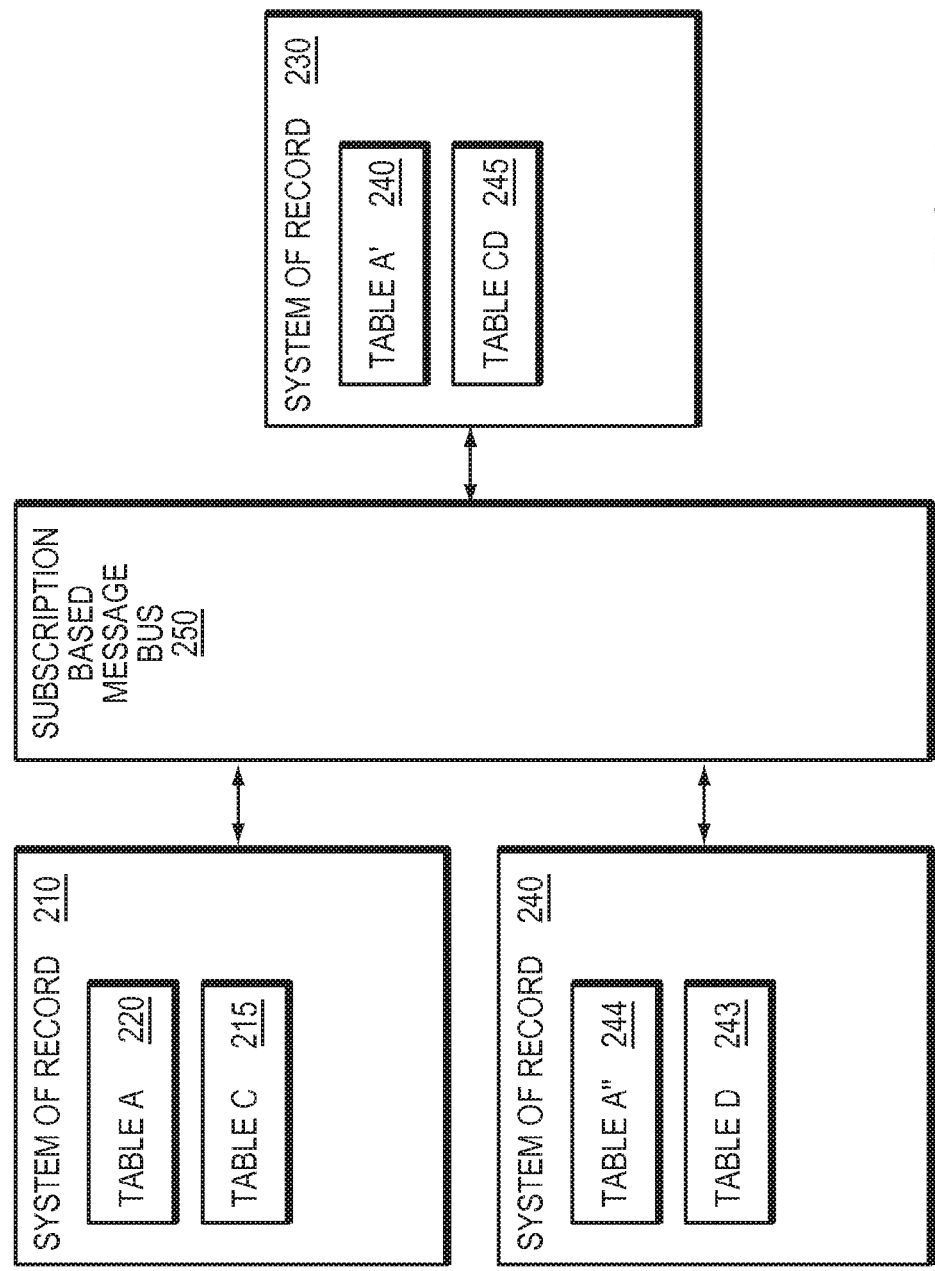
FIG. 2 is an example of an embodiment of a subscription based message bus, in accordance with an embodiment of the present disclosure.
Figure 3:
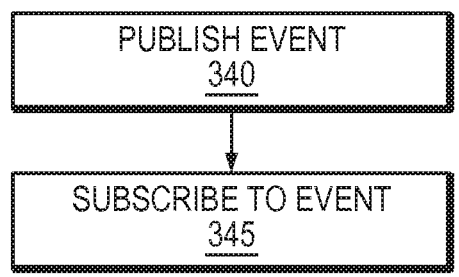
FIG. 3 is a simplified example of a method for publishing and subscribing to a message bus, in accordance with an embodiment of the present disclosure.

Refer as well to the example embodiments of FIGS. 2 and 3, which illustrate a subscription based message bus. In this embodiment, the subscription based message bus serves as a transport bus to exchange information between systems of record 210, 230, and 240. In this embodiment, each system of record publishes (step 340) and subscribes to (step 345) information changes within the message bus. The message bus may not have an ability to transfer any changes within a system if that change was not published by a first system and has another system subscribed to consume that change. The subscription based message bus may allow a company, such as that of company 100 in FIG. 1 to exchange information between system of records 110 and 130.

Figure 4:
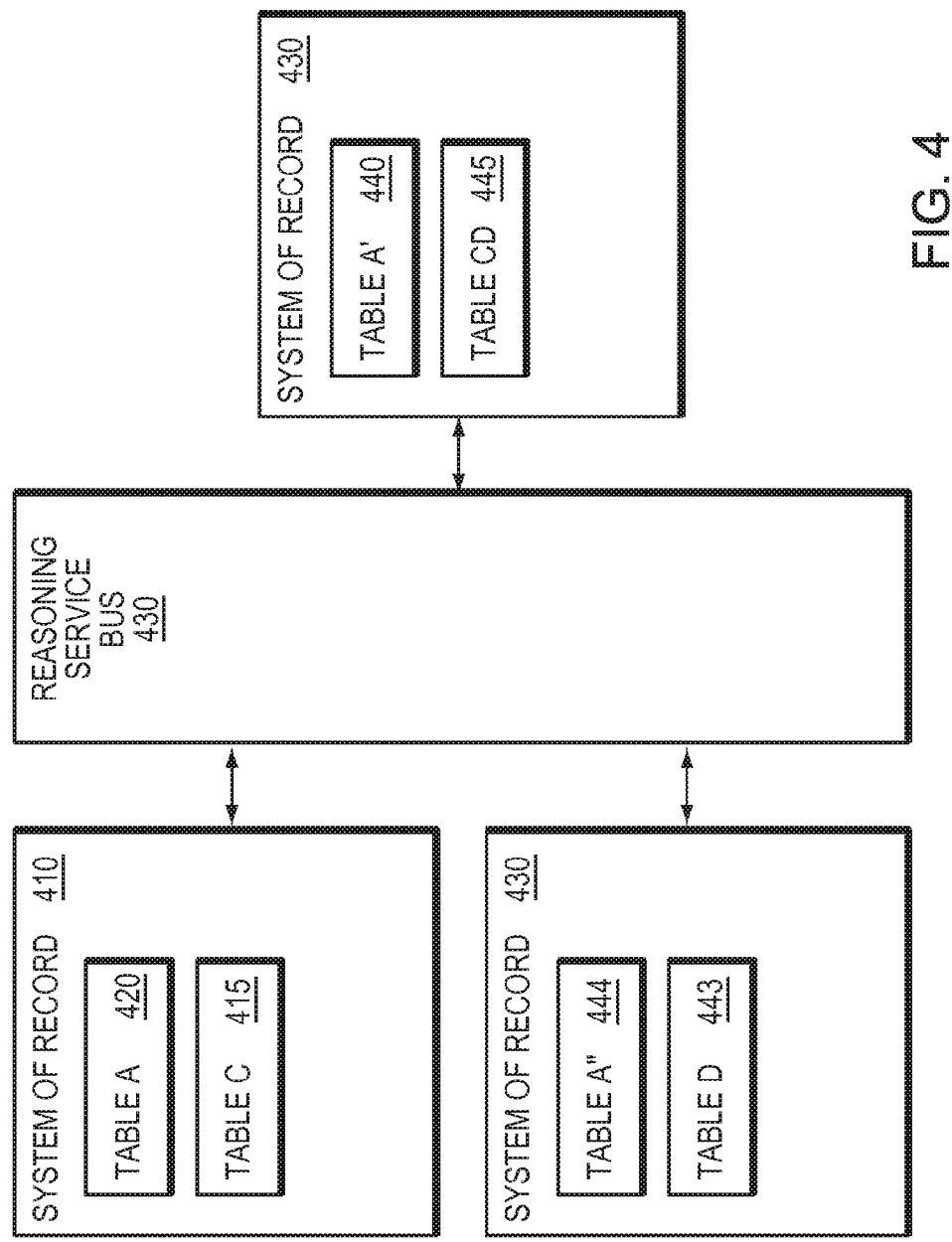
FIG. 4 is an example of an embodiment of a reasoning based service bus, in accordance with an embodiment of the present disclosure.

Refer now to the example embodiment of FIG. 4, which represents a reasoning based service bus. In the example embodiment of FIG. 4, each system of record, 410, 430, and 440, may publish changes within each respective system of record. Each of the respective changes may be conveyed to reasoning service bus 430. Reasoning service bus 330 contains logic and ability to reason on each change sent to the bus. Reasoning service bus 330 has the logic to determine to what other system of record the change should be propagated. Reasoning service bus 330 also has the ability to send a reasoned event to the other system interested in the change. Reasoning service bus 330 also has the ability to perform analytics on events.

Figure 5:
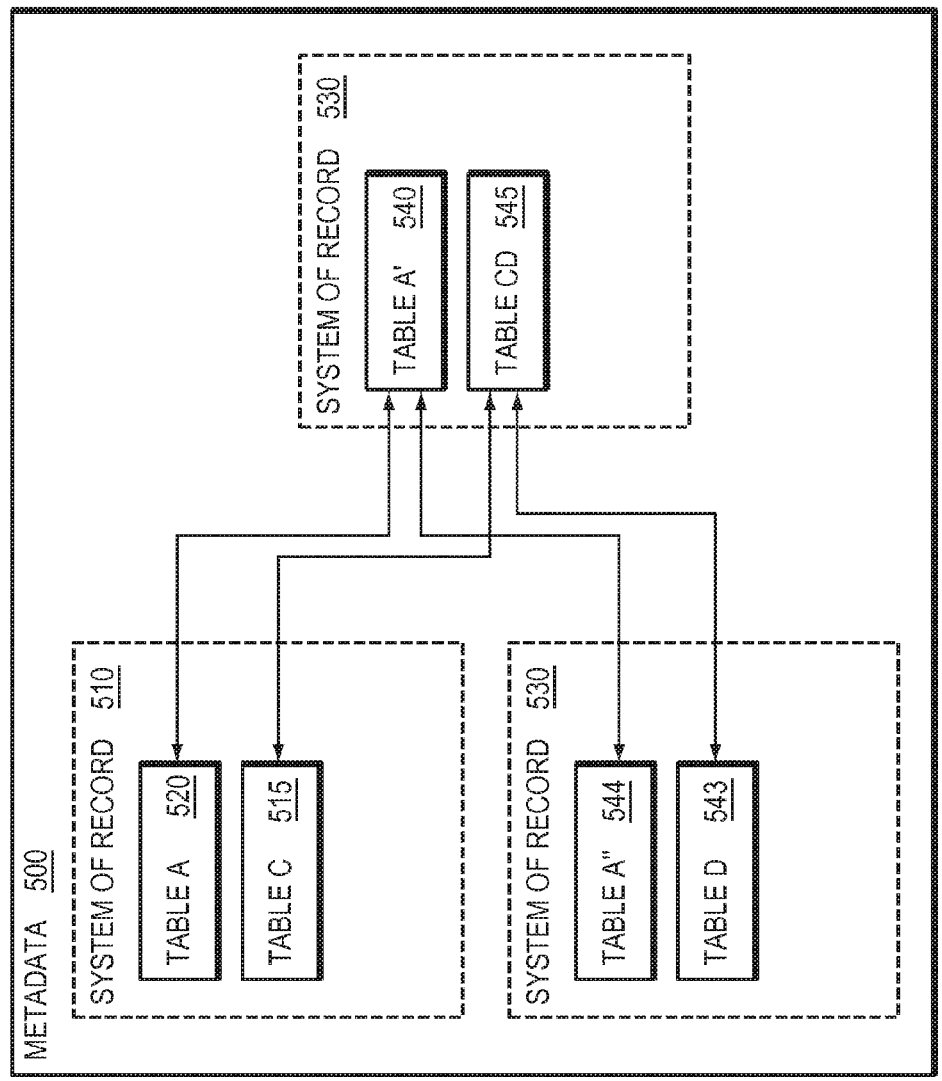
FIG. 5 is an example of an embodiment of metadata relationship between the systems of record, in accordance with an embodiment of the present disclosure.

Refer now to the example embodiment of FIG. 5, which illustrates a simplified metadata relationship 500 between the systems of record in FIG. 4. In this embodiment, table A 520 is mapped to table A' 540. Table A" 544 is mapped to Table A' 540. Table C 515 and Table D 543 are mapped to table CD 545. In this and other embodiments, the mapping may not be direct and may require intermediate transformation.

In most embodiments, this relationship information may be present in the metadata, such as metadata 500. In certain embodiments, a reasoning service bus, such as reasoning service bus 430 may contain this metadata. In almost all embodiments, the metadata information may enable a reasoning service to determine which system of record would be interested in what information from other systems. In some embodiments, the metadata information may be expressed as XML code. In other embodiments the metadata may be represented as RDF. In certain embodiments, the metadata information may be generated by a computer or software comparing database schema. In further embodiments, the metadata may be generated by a human. In still further embodiments, the metadata may be generated by combining input of a human and a computer or software.

Figure 6:
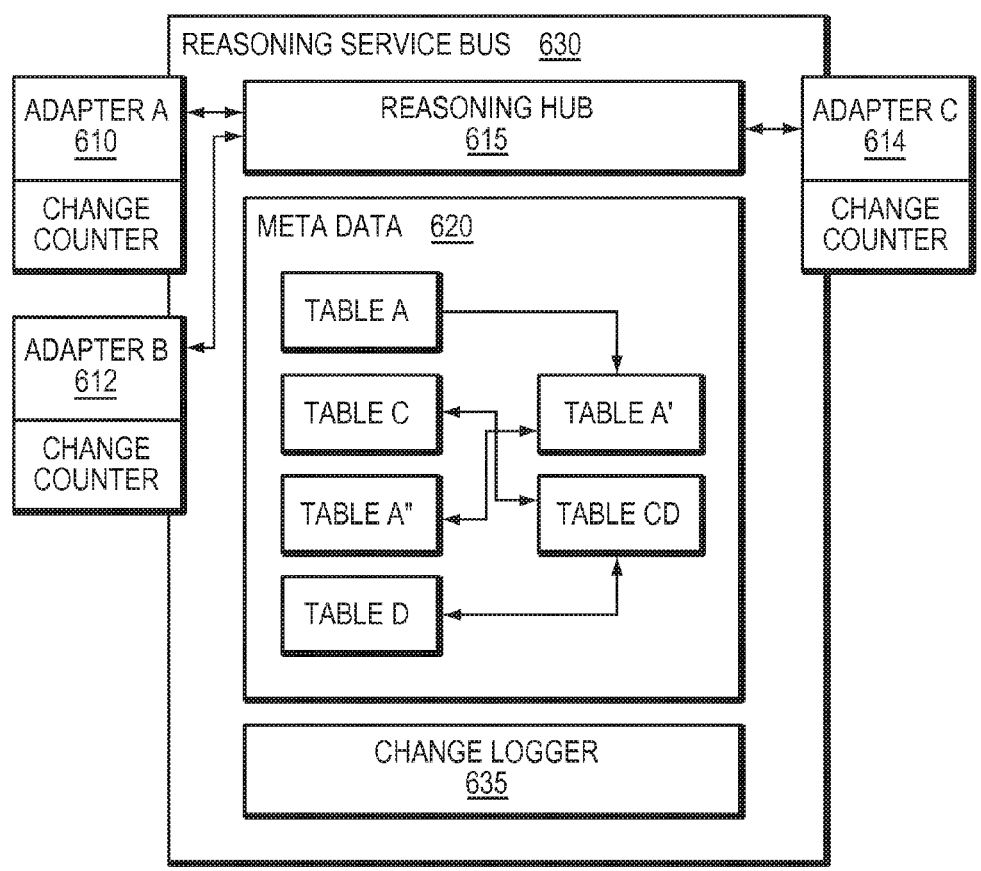
FIG. 6 is an alternative example of an embodiment of a reasoning service bus, in accordance with an embodiment of the present disclosure.

Refer now to the simplified embodiment of FIG. 6, representing an alternative embodiment of the reasoning service bus of FIG. 4. In this embodiment, reasoning service bus 630 has a reasoning hub 615, metadata 620, and change logger 635, and adapters A 610, B 612, and C 614. The adapters 610, 612, and 614 transform events generated by systems of records or databases into events able to be understood by reasoning hub 615 and each adapter has a change counter. Reasoning hub 615 has metadata 620 to give reasoning hub 620 context to events generated by different systems of records or databases. Reasoning hub 615 also has change logger 635 to enable the changes to the system to be logged. Reasoning hub 615 may also use metadata 620 to determine whether or not to propagate changes from one system of record to another.

Figure 7:
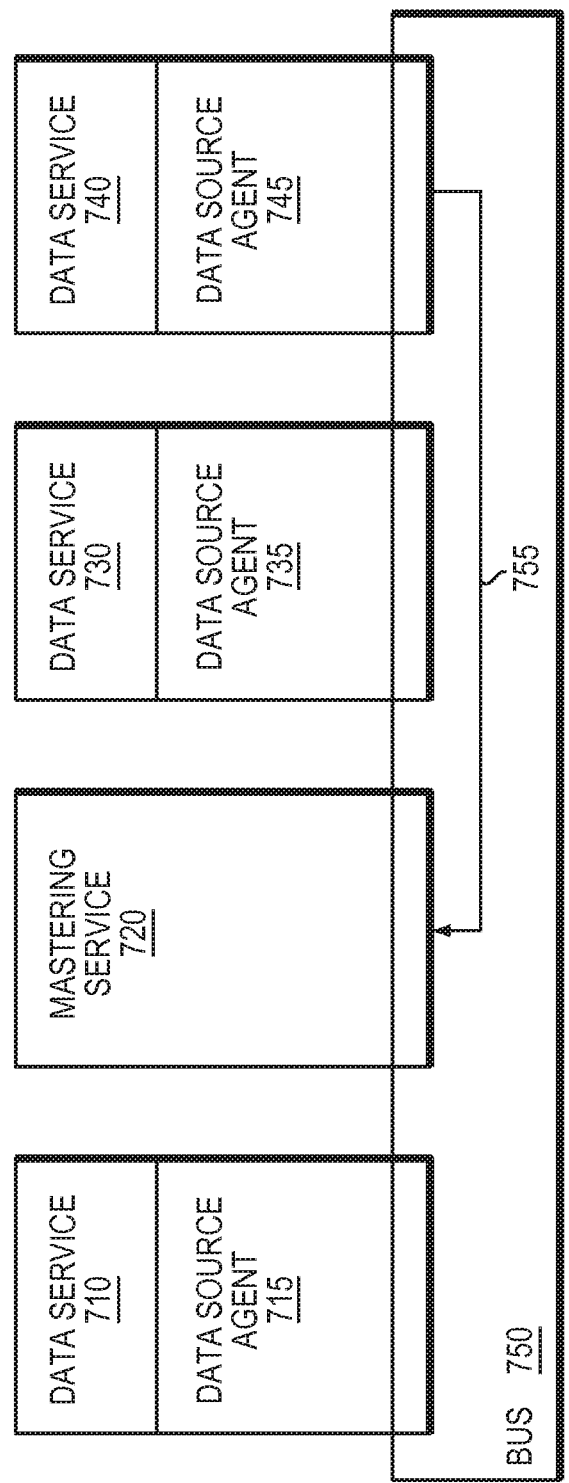
FIG. 7 is a further alternative example of an embodiment of a reasoning service bus, in accordance with an embodiment of the present disclosure.

Refer now to the simplified embodiment of FIG. 7, which represents an alternative embodiment of the reasoning service bus of FIG. 6. In the example embodiment of FIG. 7, there are three data services, 710, 730, and 740 and mastering service 720. These entities are communicatively coupled by bus 750. Each data service agent, such as 710, 730, and 740, has a data source agent such as data source agent 715, 735, and 745, respectively. An alternative way of considering the data services, master service, and bus may be that of a Virtual LAN.

Figure 8:
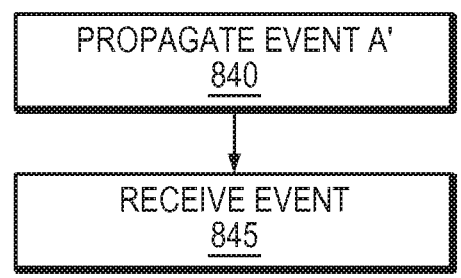
FIG. 8 is a simplified example of a method for receiving a propagated event, in accordance with an embodiment of the present disclosure.

Refer as well to the example embodiment of FIG. 8, which represents a simplified method receiving a propagated event. Data service 740 through data source agent 745 propagates event 755 to bus 750 (step 840). Bus 750 conveys event 755 to mastering service 720 which receives event 755 (step 845).

Figure 9:
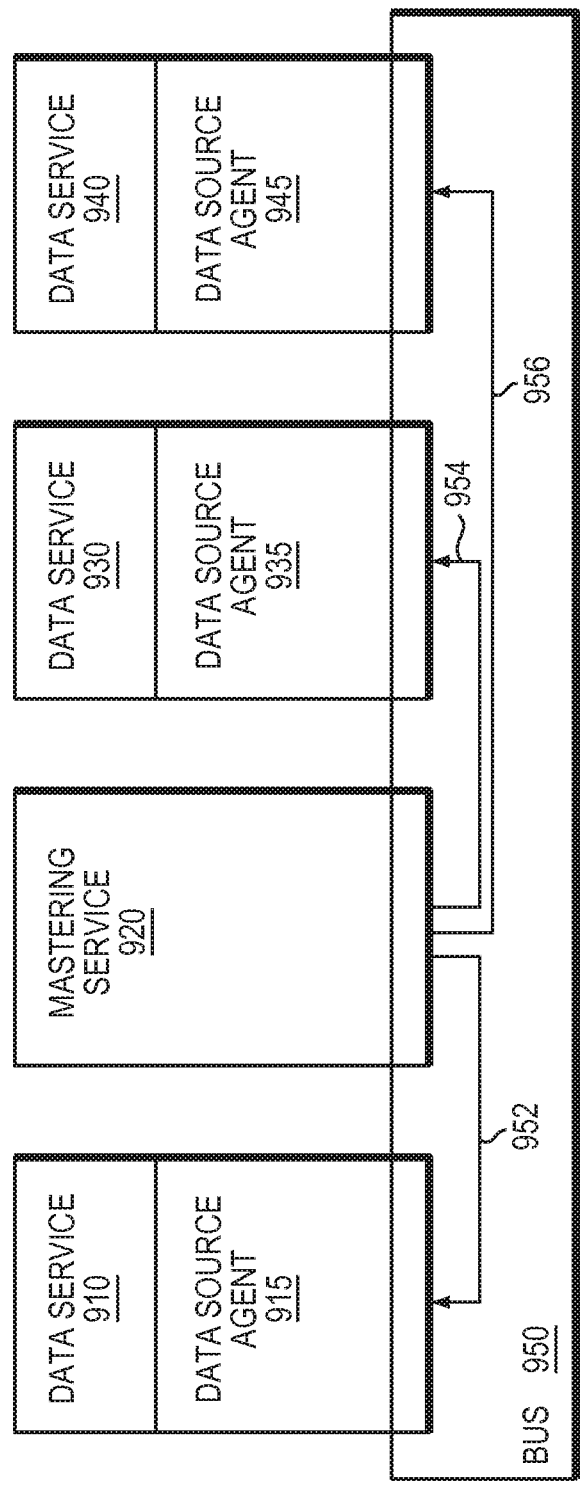
FIG. 9 is an example of an embodiment of a mastering service sending out events, in accordance with an embodiment of the present disclosure.
Figure 10:
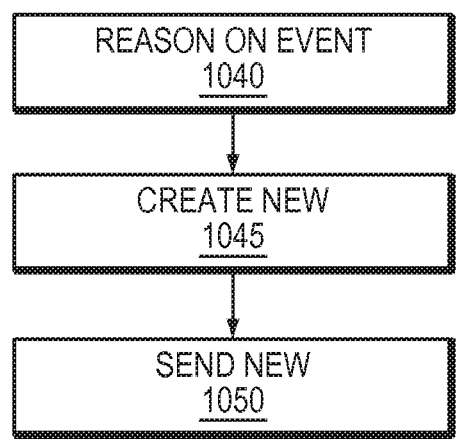
FIG. 10 is a simplified example of a method for reasoning on an event and sending out events, in accordance with an embodiment of the present disclosure.

Refer now to the simplified example embodiments of FIGS. 9 and 10, which illustrate a mastering service reasoning on an event and sending out events. Mastering service 920 reasons on a received event (step 1040). Mastering service 920 creates a new event (step 1045). Mastering service 920 sends the new event to data services interest in the event (step 1050), in this case event 952 is sent to data service 910 via data source agent 915, event 954 is sent to data service 930 via data source agent 935, and event 956 is sent to data service 940 via data source agent 945.

Figure 11:
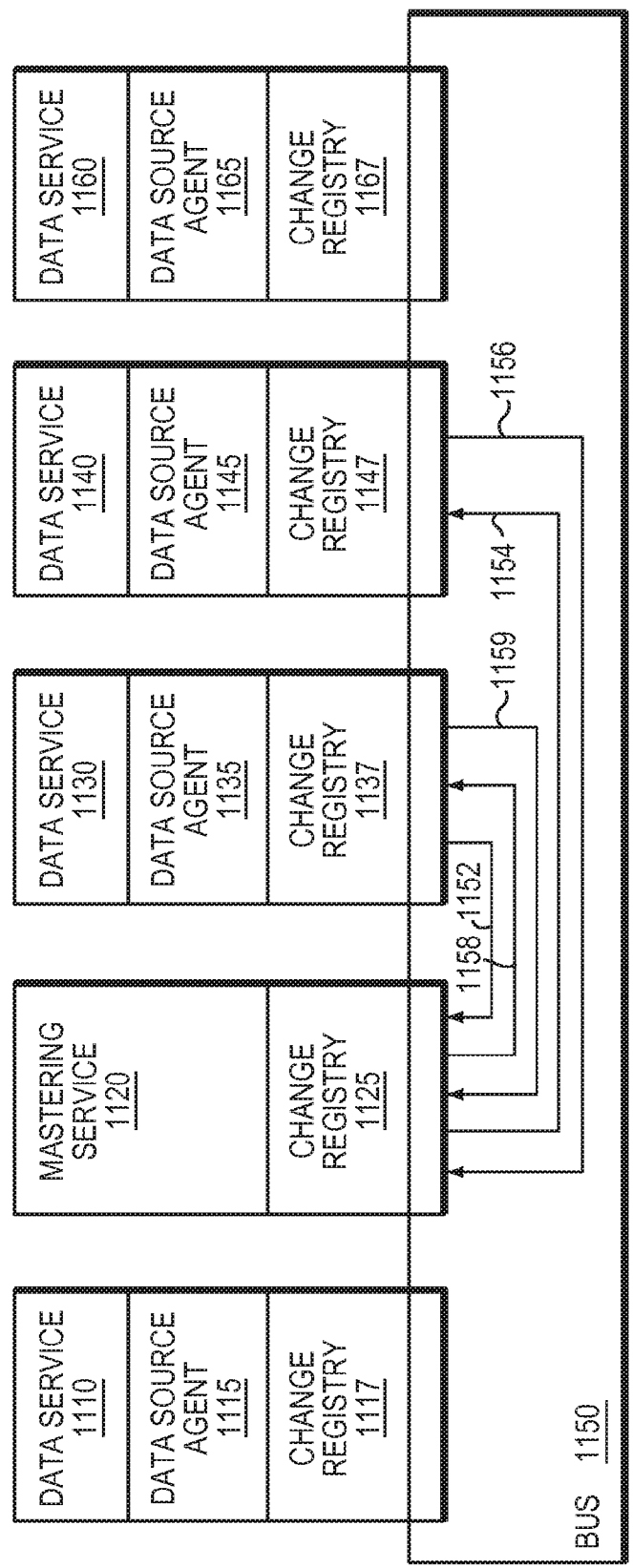
FIG. 11 is an example of an embodiment of a change storm, in accordance with an embodiment of the present disclosure.
Figure 12:
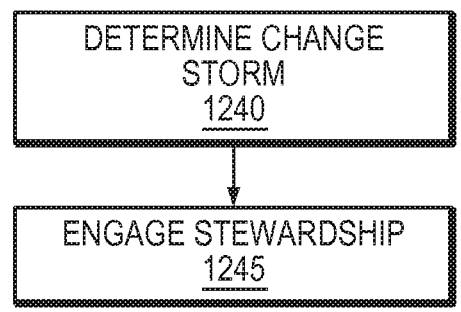
FIG. 12 is a simplified example of a method for mitigating a change storm, in accordance with an embodiment of the present disclosure.

Refer now to the simplified example embodiments of FIGS. 11 and 12, which illustrate mitigating a change storm. In the example embodiment of FIG. 11, there are four data services 1110, 1130, 1140, and 1160. Each data service has a data source agent, such as agent 1115, and a change registry 1117. There is also mastering service 1120 with a change registry 1125. Mastering service 1120 and data services 1110, 1130, 1140, and 1160 are communicatively coupled to bus 1150. As shown by events 1152, 1154, 1156, 1158, and 1159, change storm is occurring between data service 1130, 1140, and mastering service 1120. Specifically, data service 1130 sends event 1152 to mastering service, which reasons on event 1152 and sends corresponding event 1154 to data service 1140. This event violates a rule in data service 1140, which in turn sends event 1156 to mastering service 1120 telling the service the event should be undone. Mastering service 1120 reasons on this event and sends event 1158 to data service 1130, which indicates the change in event 1152 should be undone. This in turn causes data service to start the chain of events again by issuing event 1159 reissuing the change in 1152. This change storm, if unchecked, would continue unless the system was to determine a loop and break it. Mastering service 1120 detects a change storm (step 1240). Mastering service 1120 invokes stewardship (step 1245).

In many embodiments, stewardship may involve a human in the loop. In most embodiments, invoking stewardship may enable a human to intervene to stop a change storm. In at least some embodiments, a change storm may occur because two systems of record or database have different rules that may conflict with the rules of the other system. In some embodiments, stewardship may require creating a new system rule. In other embodiments, stewardship may include creating an override to account for a difference in system rules.

Figure 13:
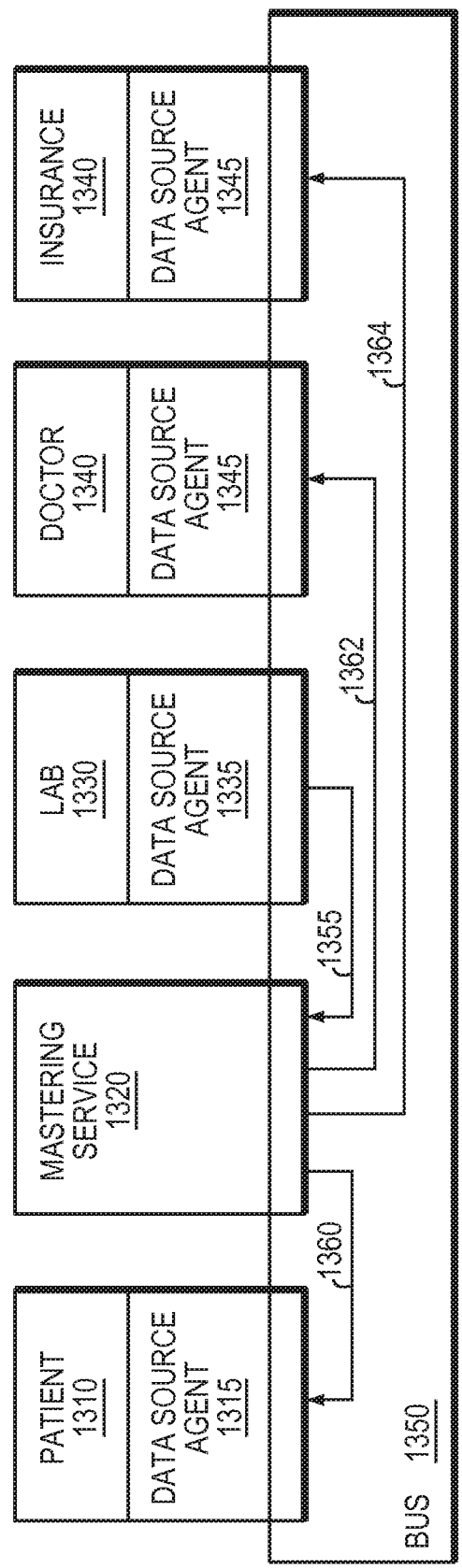
FIG. 13 is an example of an embodiment of lightweight notifications, in accordance with an embodiment of the present disclosure.
Figure 14:
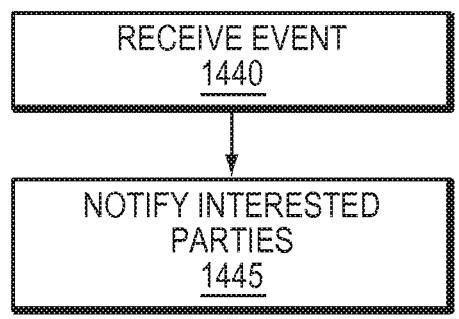
FIG. 14 is a simplified example of a method for enforcing a lightweight notification, in accordance with an embodiment of the present disclosure.
Figure 15:
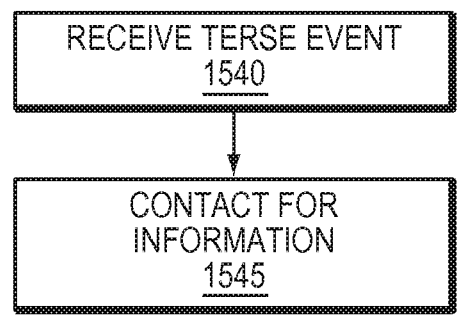
FIG. 15 is an alternative simplified example of a method for enforcing a lightweight notification, in accordance with an embodiment of the present disclosure.

Refer as well to the simplified example embodiments of FIGS. 13 and 14, which illustrate sending out and responding to a terse event or lightweight notification. In FIG. 13, Patient 1310, mastering service 1320, lab 1330, doctor 1340, and insurance 1340, are communicatively couple to bus 1350. Mastering service 1320 receives event 1355 from lab 1330 (step 1440). Mastering service 1320 sends notification events to parties interested in even 1355 (Step 1445). In this embodiment mastering service 1330 sends event 1360 to patient 1310, event 1362 to doctor 1340, and event 1364 to insurance 1340. In this embodiment, the event sent by mastering service 1320 is a terse event or lightweight notification containing notification that an event occurred and that more information about the event may be available. Doctor 1340 receives terse event or lightweight notification 1362 (step 1540). Doctor 1340 may either contact lab 1330 for more information on the lab event or may contact mastering service 1320 to gain more information about lab event 1355.

Figure 16:
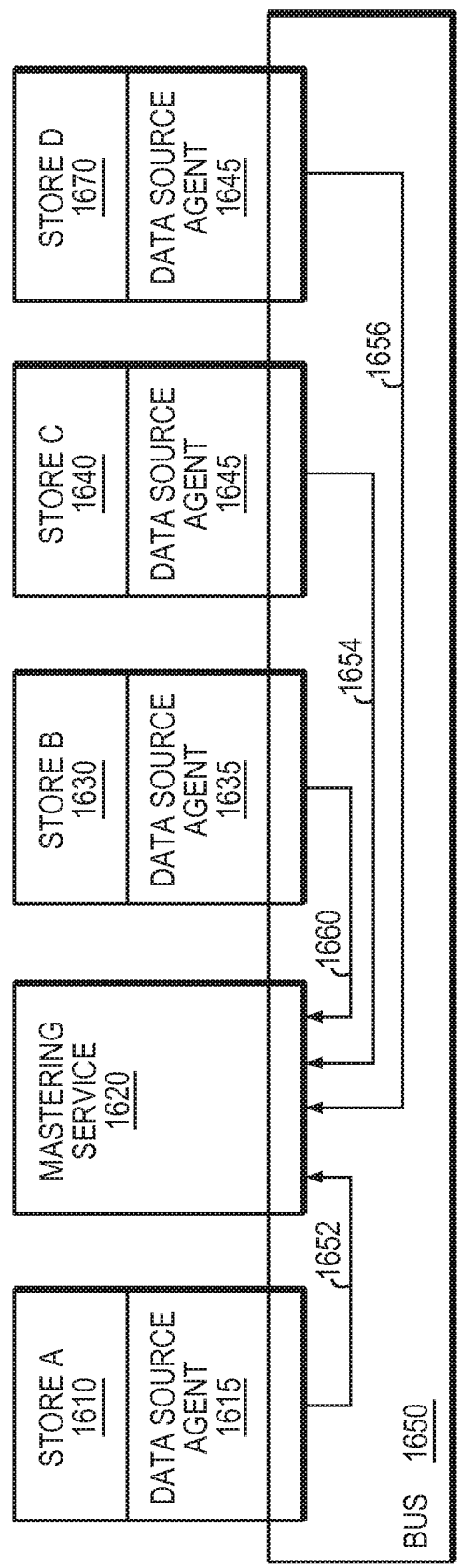
FIG. 16 is an example of an embodiment of a leases occurring in a system bus, in accordance with an embodiment of the present disclosure.
Figure 17:
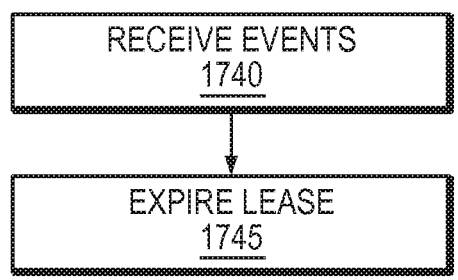
FIG. 17 is a simplified example of a method for enforcing a lease, in accordance with an embodiment of the present disclosure.
Figure 18:
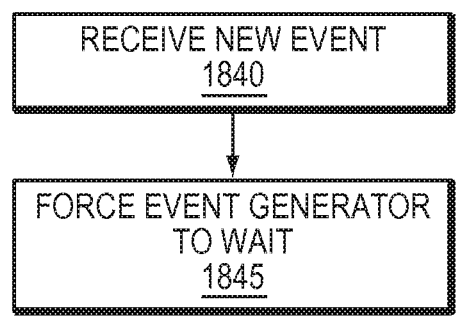
FIG. 18 is an alternative simplified example of a method for enforcing a lease, in accordance with an embodiment of the present disclosure.

Refer now to the example embodiments of FIGS. 16, 17, and 18, which illustrate a simplified example of a lease. Store A 1610, mastering service 1620, Store B 1630 Store C 1640, and Store D 1670 are communicatively coupled to bus 1650. In this example, at a given time Store A-D, 1610, 1630, 1640, and 1670 are to report to mastering service 1620 their nightly sales by a given time. The given time is designated by a lease event time. In this embodiment, Store A 1610 reports via 1652, Store C reports via event 1654 and Store D reports via event 1656 and mastering service 1620 receives these events (step 1740). The lease on the time to receive nightly sales expires (step 1745). After the expiration of the lease, Store B 1630 sends event 1660 to Mastering Service 1620. Mastering service 1620 receives event 1660 (step 1840). Instead of stopping calculation of nightly sales, mastering service 1620 forces event generation (store B 1630) to wait before its number may be included in the calculation (step 1845).

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Figure 19:
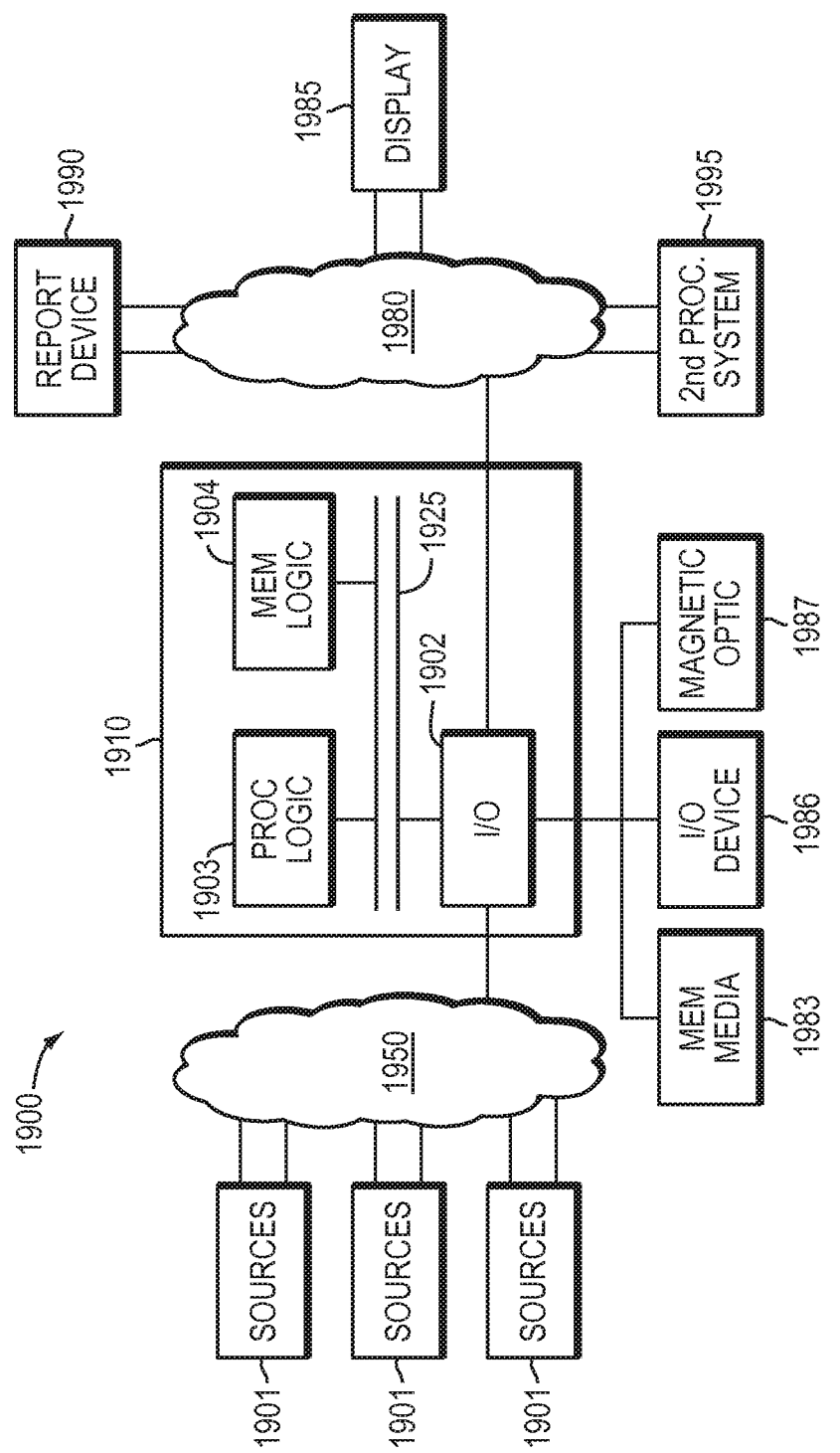
FIG. 19 is an example of an embodiment of an apparatus that may utilize the techniques described herein, in accordance with an embodiment of the present disclosure.
Figure 20:
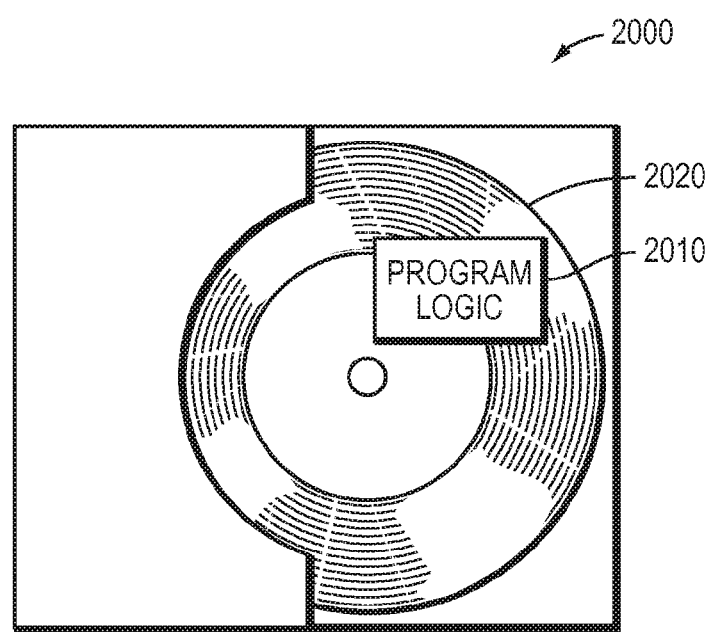
FIG. 20 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 19, the machine becomes an apparatus for practicing the invention. When implemented on one or more general-purpose processors, the program code combines with such a processor 1903 to provide a unique apparatus that operates analogously to specific logic circuits. As such a general purpose digital machine can be transformed into a special purpose digital machine. FIG. 20 shows Program Logic 2034 embodied on a computer-readable medium 2030 as shown, and wherein the Logic is encoded in computer-executable code configured for carrying out the reservation service process of this invention and thereby forming a Computer Program Product 2000. The logic 2034 may be the same logic 1940 on memory 1904 loaded on processor 1903. The program logic may also be embodied in software modules, as modules, or as hardware modules. The processors or machines may be embodied as one or more virtual processors or machines, respectively.

The logic for carrying out the method may be embodied as part of the system described below, which is useful for carrying out a method described with reference to embodiments shown in, for example, FIGS. 3 and 8.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A computer implemented method for controlling information flow between systems of record connected to a bus comprising:

establishing a lease contract for an analytic subscription;

defining an analytic subscription as an evaluation that is passed to a provider that provides a Boolean evaluation model and a potential true/false event expression;

receiving, via the bus, events from adaptors communicatively coupled between the systems of record and the bus until the expiration of the lease, wherein each of the systems of record is enabled to have a different data model, and wherein the adaptors are enabled to transform specific events of each of the different data models from each of the systems of record into an event, wherein the bus is enabled to mitigate a change storm, wherein the change storm includes multiple conflicting events received by the bus from the systems of record; wherein the change storm further includes events from different systems of record; wherein during the change storm at least two of the different systems of record have one or more rules that conflict with the other different system of record for the events included in the change storm; wherein applying the one or more rules that conflict during the change storm would not mitigate the change storm; wherein mitigating the change storm includes the bus invoking stewardship by invoking mastering services communicatively coupled to the bus; wherein the mastering services overrides the conflicting rules to mitigate the change storm; and rejecting during a specified period of time events received from the systems of record after the expiration of the lease period, wherein the specified period of time is equivalent to an amount of time to accumulate sufficient events for a particular analysis calculation, wherein the particular analysis calculation is based on the events received during the lease period, and wherein a policy is invoked to deal with a loss of access to resources.

2. The method of claim 1 further comprising:

receiving an event from a system of record of the systems of record after the expiration of the event, wherein the event includes a lightweight event, wherein the lightweight event contains metadata encapsulated within a lightweight message that indicates that the event has a temporal constraint;
rejecting the event; and
forcing the system of record to reach a consistent checkpoint before any event from the system of record is accepted.

3. The method of claim 1 further comprising:
revoking access privileges to the resources of the system of record after the expiration of a lease period.

4. The method of claim 1 further comprising:
reclaiming the resources given to the systems of record after the expiration of the lease; wherein the expiration of the lease occurs after a system of a record has consumed a predetermined amount of the resources.

5. The method of claim 4 wherein the reclaiming the resources is facilitated through lease controlled registration of topic interests by agents; and
invoking a compensating transaction upon loss of access to the resources.

6. The method of claim 2 wherein the system of record reaching a consistent checkpoint includes reading from a log.

7. The method of claim 2 wherein the system of record reaching a consistent checkpoint includes restoring from the consistent checkpoint.

8. The method of claim 2 wherein a lease manager is enabled to cancel a lease to resources associated with the lease manager.

9. The method of claim 8 wherein a client requests a renegotiation of a new lease with the lease manager in order to process further events.

10. A computer program product for transferring information between systems of record connected to a bus comprising:
a non-transitory computer readable medium encoded with computer executable program code for controlling information flow, the code configured to enable the execution of:
establishing a lease contract for an analytic subscription;
defining an analytic subscription as an evaluation that is passed to a provider that provides a Boolean evaluation model and a potential true/false event expression;
receiving, via the bus, events from adaptors communicatively coupled between the systems of record and the bus until the expiration of the lease, wherein each of the systems of record is enabled to have a different data model, and wherein the adaptors are enabled to transform specific events of each of the different data models from each of the systems of record into an event, wherein the bus is enabled to mitigate a change storm, wherein the change storm includes multiple conflicting events received by the bus from the systems of record; wherein the change storm further includes events from different systems of record; wherein during the change storm at least two of the different systems of record have one or more rules that conflict with the other different system of record for the events included in the change storm; wherein applying the one or more rules that conflict during the change storm would not mitigate the change storm; wherein mitigating the change storm includes the bus invoking stewardship by invoking mastering services communicatively coupled to the bus; wherein the mastering services overrides the conflicting rules to mitigate the change storm; and
rejecting during a specified period of time events received from the systems of record after the expiration of the lease period, wherein the specified period of time is equivalent to an amount of time to accumulate sufficient events for a particular analysis calculation, wherein the particular analysis calculation is based on the events received during the lease period, and wherein a policy is invoked to deal with a loss of access to the resources.

11. The computer program product of claim 10 the code further configured to enable:
receiving an event from a system of record of the systems of record after the expiration of the event, wherein the event includes a lightweight event, wherein the lightweight event contains metadata encapsulated within a lightweight message that indicates that the event has a temporal constraint;
rejecting the event; and
forcing the system of record to reach a consistent checkpoint before any event from the system of record is accepted.

12. The computer program product of claim 10 the code further configured to enable:
revoking access privileges to the resources of the system of record after the expiration of a lease period.

13. The computer program product of claim 10 the code further configured to enable:
reclaiming the resources given to the systems of records after the expiration of the lease.

14. The computer program product of claim 13 wherein the reclaiming the resources is facilitated through lease controlled registration of topic interests by agents; and
invoking a compensating transaction upon loss of access to the resources.

15. The computer program product of claim 11 wherein the system of record reaching a consistent checkpoint includes reading from a log.

16. The computer program product of claim 11 wherein the system of record reaching a consistent checkpoint includes restoring from the consistent checkpoint.

17. The computer program product of claim 11 wherein a lease manager is enabled to cancel a lease to resources associated with the lease manager.

18. A system for transferring information between systems of record connected to a bus, the system comprising:
the bus;
the systems of record; and
computer-executable logic operating in memory, wherein the computer-executable program logic is configured to enable:
establishing a lease contract for an analytic subscription;
defining an analytic subscription as an evaluation that is passed to a provider that provides a Boolean evaluation model and a potential true/false event expression;
receiving, via the bus, events from adaptors communicatively coupled between the systems of record and the bus until the expiration of the lease, wherein each of the systems of record is enabled to have a different data model, and wherein the adaptors are enabled to transform specific events of each of the different data models from each of the systems of record into an event, wherein the bus is enabled to mitigate a change storm, wherein the change storm includes multiple conflicting events received by the bus from the systems of record; wherein the change storm further includes events from different systems of record; wherein during the change storm at least two of the different systems of record have one or more rules that conflict with the other different system of record for the events included in the change storm; wherein applying the one or more rules that conflict during the change storm would not mitigate the change storm; wherein mitigating the change storm includes the bus invoking stewardship by invoking mastering services communicatively coupled to the bus; wherein the mastering services overrides the conflicting rules to mitigate the change storm; and rejecting during a specified period of time events received from the systems of record after the expiration of the lease period, wherein the specified period of time is equivalent to an amount of time to accumulate sufficient events for a particular analysis calculation, wherein the particular analysis calculation is based on the events received during the lease period, and wherein a policy is invoked to deal with a loss of access to resources.

19. The system of claim 18, wherein the logic further configured to enable:

receiving an event from a system of record of the systems of record after the expiration of the event, wherein the event includes a lightweight event, wherein the lightweight event contains metadata encapsulated within a lightweight message that indicates that the event has a temporal constraint;

rejecting the event; and forcing the system of record to reach a consistent checkpoint before any event from the system of record is accepted.

20. The system of claim 18, wherein the logic further configured to enable:

revoking access privileges to the resources of the system of record after the expiration of a lease period.

21. The system of claim 18, wherein the logic further configured to enable:

reclaiming resource given to the system of records after the expiration of the lease, wherein the reclaiming is facilitated through lease controlled registration of topic interests by agents; and invoking a compensating transaction upon loss of the lease.

* * * * *